United States Patent [19]

Schepers et al.

[11] Patent Number: 5,096,972

[45] Date of Patent: Mar. 17, 1992

[54] RUBBER-BASED GRAFT COPOLYMER

[75] Inventors: Herman A. J. Schepers, Stein; René H. M. Seevens, Geleen, both of Netherlands

[73] Assignee: Stamicarbon B.V., Geleen, Netherlands

[21] Appl. No.: 430,262

[22] Filed: Nov. 2, 1989

[30] Foreign Application Priority Data

Nov. 4, 1988 [NL] Netherlands .......................... 8802709

[51] Int. Cl.$^5$ .................. C08F 255/06; C08F 279/02; C08F 253/00; C08F 279/04
[52] U.S. Cl. ............................. 525/309; 525/308; 525/310; 525/316; 525/319
[58] Field of Search ............... 525/308, 309, 310, 316, 525/319

[56] References Cited

U.S. PATENT DOCUMENTS

| | | |
|---|---|---|
| 2,911,398 | 11/1959 | Vandenberg . |
| 2,972,605 | 2/1961 | Natta et al. . |
| 3,484,353 | 12/1969 | Sharp ................................ 525/388 |
| 3,489,822 | 1/1970 | Witt et al. . |
| 3,846,266 | 11/1974 | Duynatee .......................... 525/388 |
| 4,166,081 | 8/1979 | Fournier ............................ 525/86 |
| 4,704,431 | 11/1987 | Stuart ................................ 525/86 |
| 4,716,197 | 12/1987 | Seiss .................................. 525/86 |
| 4,788,250 | 11/1988 | Kitahara ............................ 525/86 |

FOREIGN PATENT DOCUMENTS 8606731 11/1986 World Int. Prop. O. .

OTHER PUBLICATIONS

European Search Report and Annex, Application No. 89202755.8.

Primary Examiner—Melvyn I. Marquis
Assistant Examiner—Vasu S. Jagannathen
Attorney, Agent, or Firm—Cushman, Darby and Cushman

[57] ABSTRACT

The invention relates to a graft copolymer obtainable by reacting a rubbery base polymer, which has been provided with hydroperoxide groups via photo-oxidation, with one or more radical-polymerizable graft monomers, the graft copolymer being based upon 90-20 parts of a rubbery base polymer containing at least 4 (four) hydroperoxide groups per rubber chain and 80-10 parts of one or more of the graft monomers.

10 Claims, No Drawings

RUBBER-BASED GRAFT COPOLYMER

The invention relates to a graft copolymer obtainable by reacting A) a rubbery base polymer that has been provided with hydroperoxide groups via photo-oxidation, with B) one or more radicalpolymerizable graft monomers.

Such a graft copolymer is known from WO86/06731. In this publication such a graft copolymer is used in a melt blend with a rigid matrix based on a monovinylaromatic monomer. In the preparation of the graft copolymer a rubbery base polymer, provided with hydroperoxide groups via photo-oxidation, is used as starting product.

The general process of grafting one or more radical-polymerizable monomers onto a rubbery base polymer provided with hydroperoxide groups has been known for a long time. Rubbery base polymers can be provided with hydroperoxide groups by means of oxidation reactions with the aid of per-compounds, such as persulphates and peroxides, or by means of autocatalytic oxidation reactions. However, both types of reactions results in polymer derivatives which, in addition to a small number of hydroperoxide groups, contain a large variety of other oxygen-containing groups, such as hydroxyl, ketone, aldehyde, carboxyl and ester groups. Not only is the yield of hydroperoxide groups small with such processes and are groups formed in an onto the polymer chains which are not always harmless to the properties of the polymer prepared, but these processes also lead to a certain degree of chain scission, which results in a large number of different compounds and simultaneous crosslinking. These compounds can have an adverse effect on the properties of the polymer derivatives thus obtained. Examples of such polymer derivatives are to be found in US-A-3,489,822.

The American patent U.S. Pat. No. 3,484,353 suggests a process for the preparation of hydroperoxide derivatives of polymers which contain intralinear C=C unsaturations in the chain, which process consists in subjecting such polymers to irradiation with visible light in the presence of oxygen and a photosensitizer (photo-oxidation).

In U.S. Pat. No. 3,846,266 a hydroperoxide derivative is prepared, also by photo-oxidation of a rubbery base polymer, by using polymers containing C=C bonds in the non-linear part of the polymer chain, the carbon atoms of which possess either two hydrocarbon groups in vicinal cis position with respect to one another which do not form part of the same cyclic structure or at least three hydrocarbon groups.

In the aforementioned WO86/06731 the graft copolymer is prepared by photo-oxidizing the rubber dissolved in the graft monomer or graft monomers in such a manner that 0.5–4 hydroperoxide groups are formed per rubber chain, after which the polymerization is carried out. This does not only result in graft copolymerization of the monomer or the monomers onto the rubber chain, but also in—substantial—polymerization of the monomer or the monomers, which in its entirety leads to a rubber-modified styrene polymer.

The applicant has found that when a different graft base is chosen, the graft copolymer according to the invention also presents improved properties as compared with the already known graft copolymers, such as greater strength, provided that a specified weight ratio between the graft base and the graft monomers is adhered to.

The graft copolymer according to the application is thus characterized in that it is based upon a) 90–20 parts by weight of a rubbery base polymer containing at least 4 (four) hydroperoxide groups per rubber chain, and b) 80–10 parts by weight of one or more of the graft monomers.

Surprisingly, by using a rubbery base polymer with more than 4 hydroperoxide groups per rubber chain, a graft copolymer is obtained which has greatly improved properties compared with the known graft copolymers as described in WO 86/06731, which states that optimum properties are obtained in the range of 0.5–4 hydroperoxide groups per rubber chain. The number of hydroperoxide groups per rubber chain is obtained by multiplying the number of hydroperoxide groups per kilogram of rubbery base polymer by the number average molar mass of the rubbery base polymer, expressed in kilograms per mole.

It seems likely that such improved properties are the result of the fact that improved grafting onto the rubber chain is obtained by using at least 4 hydroperoxide groups per rubber chain. The applicant has found that the conversion of hydroperoxide groups into graft copolymer is far from effective. Only a limited number of hydroperoxide groups is converted into graft copolymer chains of sufficient length.

For the sake of simplicity and clarity the constituent parts of the graft copolymer will be discussed separately below.

A) The rubbery base polymer

As graft base of the present application use may be made of rubbery base polymers which can be provided with hydroperoxide groups via photo-oxidation. The polymers described in U.S. Pat. No. 3,484,353 and those in U.S. Pat. No. 3,846,266 as well as mixtures hereof may be used. Examples hereof are:
olefinically unsaturated polymers such as:
  natural rubbers;
  polymers derived from diolefin, such as butadiene, chloroprene,
  copolymers derived from diolefin and vinyl compounds, such as styrene, acrylonitrile,
  ethylene-α-alkene-diene-polymers (EADM rubbers),
  which polymers must meet the criteria given in U.S. Pat. No. 3,846,266.

All these rubbery base polymers may be provided with hydroperoxide groups via the photo-oxidation process known per se; see the aforementioned U.S. patents.

Photo-oxidation is here understood to be an oxidation in which light and a photo-sensitizer convert oxygen into singlet oxygen, which singlet oxygen then effects the oxidation of the polymer. For the sake of clarity it should be mentioned here that this concept does not include auto-oxidation catalyzed by light. Photo-oxidation reactions can be distinguished from auto-oxidation reactions by the addition of oxidation inhibitors. Oxidation inhibitors slow down auto-oxidations but not photo-oxidations.

The light to be used may vary considerably in wavelength. Visible light is preferred. The light used may both monochromatic and polychromatic. The effectiveness of the light used depends greatly on the choice of the sensitizer used. The light used must be sufficiently absorbed by the sensitizer to render good effectiveness. Light with a wavelength differing from that of visible light results in a certain degree of photo-oxidation with the formation of hydroperoxide groups in the polymer but also leads to auto-oxidation, photolysis and other radical reactions, which, in turn, can lead to the formation of undesired products.

The photo-oxidation can be effected at almost any temperature, since the rate of photo-oxidation reactions is virtually independent of the temperature. The only temperatures that must be avoided are those at which the hydroperoxide groups formed immediately decompose again. On the whole, a temperature may be used between $-50°$ C. and $+120°$ C., and more in particular between $0°$ C. and $100°$ C.

The photo-oxidation can be effected using polymers in solution, in dispersion or in latex, or solid polymers.

If use is made of a polymer in solution the choice of the solvent is greatly dependent on the solubility of the contained rubbery polymer. In general, use may be made of hydrocarbons, for example alkanes such as n-pentane, n-hexane, isooctane, n-octane, nonane, decane, aromatics such as toluene or xylene. Other solvents such as pyridine, tetrahydrofuran, acetone, alcohols such as methanol and ethanol and dimethyl sulphoxide may also be used.

The photo-oxidation can also be carried out if the polymer is a solid, a photo-sensitizer also being incorporated in the solid phase. It is for example possible to use a polymer in the form of crumb or moulded products (such as sheets).

The oxygen concentration is preferably chosen sufficiently high so that it does not determine the speed of the photo-oxidation. To this effect it is, for example, possible to supply oxygen at a speed that is at least the same as the speed at which oxygen is absorbed into the polymer. Any method that is suitable for mixing a gas and a (viscous) liquid or solid may be used.

As oxygen source use may be made of both pure oxygen and an oxygen mixture, diluted with inert gases, such as nitrogen. Air is very suitable for this purpose.

Any photo-sensitizer may be used. The effectiveness of these photo-sensitizers may vary considerably and depends greatly on the wavelength of the light used. Examples of suitable photo-sensitizers are porphin derivatives such as tetraphenyl porphin, and further for instance chlorophyll, casein, methylene blue, methyl violet, fluorescein, hemin, anthracene, acridine and Rose Bengal.

The amount of sensitizer may vary within wide limits, but usually only small amounts are used, for example between 0.001 and 0.1 wt. % relative to the weight of the polymer used.

The concentration of hydroperoxide groups on the photo-oxidized rubbery base polymer can be calculated by reducing the hydroperoxide groups with triphenylphosphine. The concentration of hydroperoxide groups per kilogram of rubber can be determined from the amount of triphenylphosphine oxide formed, which can be analysed by means of gas chromatography. Another very suitable method for determining the amount of hydroperoxide groups is the following: photo-oxidation tests with a model substance (2-ethylidene-norbornane) have shown that the oxygen absorbed in the photo-oxidation is, in molar terms, quantitatively converted into hydroperoxide; in addition, that reducing this with an excess of triphenylphosphine results in complete conversion into hydroxylnorbornane. It has also been found that (in molar terms) the maximum amount of oxygen absorbed corresponds to the concentration of photo-oxidizable compound(s) in both the model substance and the rubbery polymer. The absorbance at two wavelengths relevant to hydroxyl (3600 and 3400 cm$-1$) of photo-oxidized rubber that has been converted into the corresponding hydroxyl rubber by treatment with triphenylphosphine can be determined via infrared transmission spectrophotoscopy. By preparing mixtures of known photo-oxidized (and then reduced) rubbers on the one hand and, on the other, the starting materials, two calibration lines are obtained per rubber starting material. With the aid of these calibration lines, the concentration of hydroperoxide groups in any photo-oxidized rubbery base polymer can be determined, after reduction with triphenylphosphine.

The number of hydroperoxide groups per rubber chain is calculated by multiplication with the number-average molar weight of the rubbery base polymer used (which can be determined with the aid of, for example, gel permeation chromatography).

It is advantageous to use a rubbery base polymer with 5–35 hydroperoxide groups per chain, in particular with 6–20 hydroperoxide groups per chain. The maximum possible number of hydroperoxide groups per rubber chain is, of course, determined by the concentration of photo-oxidizable groups in the rubbery base polymer. On the basis of the results obtainable with the graft copolymer, a person skilled in the art can easily determine, starting from the doctrine of the present application, how many photo-oxidizable groups the rubbery base polymer must have.

(B) Graftable, radical-polymerizable monomers

Any monomer or combination of monomers that can be polymerized via a radical mechanism may be used as basic grafting material for the graft copolymer.

For example, monovinyl-aromatic monomers are very suitable for use as a graft copolymer according to the invention. Examples of this are:
styrene, whether or not substituted (such as styrene, α-alkyl styrenes, halo-substituted styrenes, ring-substituted alkyl styrenes),
vinylnaphthalene,
vinylanthracene.

These monomers may be used either separately or together with other copolymerizable monomers. Examples of such copolymerizable monomers are:
unsaturated nitriles (such as acrylonitrile, methacrylonitrile)
conjugated dienes (such as butadiene)
α- or β-unsaturated carboxylic acids or derivatives thereof (anhydrides, esters or semiesters thereof, such as acrylic acid, maleic anhydride, methyl methacrylate).

Monovinyl-aromatic monomers other than those mentioned may also be used as basic grafting material, such as:
unsaturated nitriles (for example acrylonitrile)
α- or β-unsaturated carboxylic acids or derivatives thereof (anhydrides, esters or semiesters, such as acrylic acid, maleic anhydride, methyl methacrylate).
vinyl halides (such as vinyl chloride).

(C) The graft copolymer

The graft copolymer according to the invention can be prepared by grafting one or more radical-polymerizable monomers onto the rubbery base polymer provided with hydroperoxide groups. A copolymer that has been subjected to the grafting reaction for a sufficiently long time so that the hydroperoxide groups have been largely converted during the grafting, is particularly preferred. This can be determined or derived in various manners:

a) by determining the residual hydroperoxide content via reduction with triphenylphosphine (similarly to the determination of the original content of hydroperoxide groups).

b) the concentration of residual hydroperoxide groups can, for example, be derived from:
   1) the change in the concentration of the product that is soluble in spirit during the grafting or
   2) the change in the concentration of graft monomer(s) of the graft copolymer as a function of the grafting time.

If the hydroperoxide groups have been completely converted the concentration of product that is soluble in spirit or the concentration of graft monomer(s) of the graft copolymer will remain constant with time.

The graft copolymerization can be carried out in various manners. Preferably a solution of the rubbery base polymer provided with hydroperoxide groups is subjected to the action of the monomer (or monomers) desired. Any conventional, inert solvent for the polymer may be used. The solvent may be aliphatic, cycloaliphatic or aromatic, whether or not substituted. Examples are (cyclo)hexane, xylene, chlorobenzene and toluene.

If a solvent for the rubbery base polymer has been used in the preparation of the hydroperoxide, it is preferable to also use that solvent in the grafting-process.

The grafting temperature may be room temperature, but more commonly elevated temperatures are used (over 50° C.), but preferably not over 150° C., because then the thermal polymerization into homo- or copolymers will gain the upper hand.

The reaction product obtained can be isolated by methods known per se, such as evaporation, steam distillation or via e.g. precipitation. The homo- or copolymer that is also formed from the monomers used in the grafting-process can be separated from the graft copolymer via extraction with a suitable solvent, such as acetone or MEK (methyl ethyl ketone). The choice of solvent is subject to the condition that the homo-/copolymer formed shall dissolve and the graft copolymer shall not.

As component B) use is advantageously made of a monovinylaromatic monomer, whether or not substituted. Examples are: styrene, α-methylstyrene, paramethylstyrene, halogenated styrenes. More in particular such a monomer is used in combination with either b') an unsaturated nitrile monomer (preferably acrylonitrile) or b'') an α or β unsaturated carboxylic acid or a derivative thereof (preferably methyl methacrylate or maleic anhydride).

It is also a advantage to use methyl methacrylate as graft monomer.

A special feature of such available graft copolymers is that they have good resistance to organic solvents; they have increased rigidity and strength.

The graft copolymer according to the invention is eminently suitable for use as a thermoplastic elastomer if the graft copolymer consists of the reactionproduct of:

a) 75-50 parts by weight of A), with
b) 50-25 parts by weight of B)

A particularly good product is obtained when the fraction that is extractable with spirit is removed from the graft copolymer thus obtained. This improves the aforementioned and other properties of the graft copolymer even more compared with those of the original graft copolymer.

Graft copolymers according to the invention may be used as such, but may also be vulcanized first with the aid of conventional vulcanizing agents.

The graft copolymers according to the invention may also contain the usual additives such as antistats, antioxidants, lubricants, flame retardants, stabilizers, pigments, chalk, etc.

The invention will be further elucidated with the aid of the following examples, without being limited hereto.

EXAMPLE I

A 150-Watt halogen lamp had been placed beneath a glass reaction vessel with a volume of 4.0 l and a flat bottom. The reaction vessel was equipped with a heating jacket, an inlet tube, a thermometer, a stirrer and a cooler with a discharge tube.

Into the reactor 1.60 l of xylene was introduced in which 0.227 kg of KELTAN 312$^R$[EPDM rubber of DSM] and 1.14 g of Irganox 1076$^R$ [stabilizer of Ciba Geigy] had been dissolved. In addition to 54% (m/m) of ethylene, the rubber contained 4.4% (m/m) of 2-ethylidene-norbornene. Its Mooney viscosity was 36 (ML 1+4, 125° C.). The ethylidene-norbornene group of the rubber is photo-oxidized.

With stirring, and at a temperature of 80° C., the liquid was saturated with pure oxygen supplied via the inlet tube.

After the addition of 10.5 mg of tetraphenylporphine as sensitizer, a gas burette filled with oxygen was connected to the reactor, which was then illuminated. After 5.25 hours the oxygen absorbance was no longer measurable. The amount of oxygen absorbed was 1.876 l NTP (=0.0837 moles).

The amount of KELTAN 312 used contained 0.0832 moles of 2-ethylidene-norbornene as measured with the aid of pyrolysis gas chromatography, after calibration with model substances. After the aforementioned photo-oxidation the absorbance of the 2-ethylidene-norbornene group at 1690 cm$^{-1}$ that is relevant for infrared transmission spectrophotoscopy (Perkin Elmer 682) appeared to be no longer measurable. Comparable tests with the model substance 2-ethylidene norbornene also showed that in molar terms the amount of oxygen absorbed corresponded to the conversion into hydroperoxide, as determined by titration with potassium iodide.

A small sample of the reaction liquid was reduced with an excess of triphenylphosphine and the hydroxyl-containing rubber thus obtained was recovered by precipitation in acetone and drying. The Hoekstra plasticity of the sample was determined. This appeared to have hardly changed (KELTAN 312 blank: 40; after photo-oxidation: 42). No gel had been formed either (boiling toluene, 20 hours). Infrared transmission spectrophotoscopy showed that the rubber had not oxidized. Apparently the molecular structure of the rubber had hardly changed.

In addition, the absorbances relevant for hydroxyl were measured at 3600 and 3400 cm$^{-1}$ and standardized at 10 mg/cm$^2$. For the absolute analysis of random samples, of importance for the following examples, the aforementioned absorbances were measured of ten different mixtures (with known compositions) of the KELTAN 312 starting product and the hydroxyl-containing KELTAN 312 described above, and calibration lines were drawn.

A calibrated gel permeation method (Waters M-150-C) was used to determine the number average molar mass of the KELTAN 312 rubber used; this was found to be 40 kg per mole. The number of hydroperoxide groups per rubber chain of the sample described above was determined as follows (oxygen consumption in mol/kg of rubber times the molar mass of the rubber in kg/mole):

$$\frac{0.0837 \cdot 40}{0.227} = 14.8$$

The photo-oxidized rubber obtained was provided with polystyrene grafts by first expelling the dissolved oxygen from the reaction mixture with the aid of pure nitrogen, after which an extra 1.58 of xylene was added, followed by 0.454 kg of the styrene monomer to be grafted. The grafting was started by increasing the temperature to 120° C. and was continued for 2.5 hours.

After the grafting triphenylphosphine was added and the graft copolymer was recovered by precipitation at room temperature, with gentle stirring in an excess of acetone and drying.

The mass balance and the infrared transmission spectrum of the product obtained were used to determine the styrene content of the graft copolymer. This was found to the 33% (m/m).

The graft copolymer thus obtained was used to compression mould plates measuring 50*50*1 mm in 3 minutes at 190° C. and a pressure of 150 kN. A tensile test was carried out according to standard ISO 37 (specimen No 3).

An extraction was carried out to determine, among other aspects, the quality of the grafting (the portion of the original amount of rubber that had been insufficiently grafted). To this effect the graft copolymer was boiled in n-hexane, the principal component of (special boiling point) spirit, for 20 hours and then centrifuged. In this manner 36% (m/m) of the graft copolymer, based on the original amount of rubber, remained dissolved.

Low gel content is important for good processability as a thermoplastic. This was tested by submerging the graft copolymer contained in a CrNi wire gauze cage with apertures of 0.3 mm in boiling toluene for 20 hours. The residue in the cage (gel) was determined by weighing after drying. The gel content of the graft copolymer was only 14% (m/m) in spite of the high hydroperoxide content per rubber chain of 14.8, which could potentially cause considerable crosslinking.

The following table I gives a summary of the results obtained for the graft copolymer.

The same analyses and tensile tests were used in the following examples and comparative experiments. In addition, instead of using the gas burette filled with oxygen, a gas mixture of 72 vol. % oxygen and 28 vol. % nitrogen was passed through the reactor at a rate of 5 l/hour and a pressure of 1 bar.

COMPARATIVE EXPERIMENT A 1.60 l of xylene, in which 0.227 kg of KELTAN 312 had been dissolved, was fed to the reactor of example I. The gas mixture was passed through, with stirring, at 90° C. until the solution was saturated with oxygen.

Then 20.3 g of benzoyl peroxide (=0.084 mole) was introduced for the formation of hydroperoxide groups on the rubber. With continued supply of the gas mixture, the solution was left to react for 3 hours. After this, the solution was left to postreact for another 10 minutes at 120° C. to remove the residual benzoyl peroxide.

A small sample of the reaction liquid was reduced with triphenylphosphine. The Hoekstra plasticity appeared to have increased to 56. An infrared transmission spectrum was recorded. The number of hydroperoxide groups per rubber chain appeared to be 3 (as determined via the calibration lines). The reacted rubber contained a large number of carbonyl groups, in contrast with the photo-oxidized rubber.

The grafting was carried out according to example I. The styrene content of the product obtained was 18% (m/m). Testing the tensile strength yielded a modulus at 100% elongation of 1.1 MPa, a tension at break of 1.3 MPa and an elongation at break of 310%. The hexane-soluble fraction was 95% (m/m). No toluene gels were found.

The following table II compares the results with those of example I.

TABLE II

| Example No. Comp. exp. No | Duration of illumination hours | —OOH/ chain | Styrene content % | Fraction soluble in hexane % | Toluene gel % | Modulus at 100% elongation MPa | Tension at break MPa | Elongation at break % |
| --- | --- | --- | --- | --- | --- | --- | --- | --- |
| I | 5.25 | 14.8 | 33 | 36 | 14 | 8.5 | 11.2 | 150 |
| A | n.a. | 3 | 18 | 95 | 0 | 1.1 | 1.3 | 310 |

These results show that the use of a peroxide for the formation of hydroperoxide on a rubber leads to unsatisfactory grafting results and is not attractive from an economic point of view.

EXAMPLES II, III and IV and COMPARATIVE EXPERIMENTS B, C and D

In these examples the influence was investigated of the number of hydroperoxide groups per rubber chain on the composition and properties of the graft copolymers.

The photo-oxidations were carried out according to example I. Different amounts of hydroperoxide per rubber chain were obtained by varying the illumination time.

The graft reactions were also carried out according to example I, with the exception that 0.795 kg of styrene and 1.30 l of xylene were used.

TABLE I

| Example No. | Duration of illumination hours | —OOH/ chain | Styrene content % | Fraction soluble in hexane % | Toluene gel % | Modulus at 100% elongation MPa | Tension at break MPa | Elongation at break % |
| --- | --- | --- | --- | --- | --- | --- | --- | --- |
| I | 5.25 | 14.8 | 33 | 36 | 14 | 8.5 | 11.2 | 150 |

TABLE III

| Example No. Comp. exp. No. | Duration of illumination hours | —OOH/ chain | Styrene content % | Fraction soluble in hexane % | Toluene gel % | Modulus at 100% elongation MPa | Tension at break MPa | Elongation at break % |
| --- | --- | --- | --- | --- | --- | --- | --- | --- |
| B | 0 | 0 | 0* | 100 | 0 | 0.6 | 0.6 | 400 |
| C | 0.17 | 1.1 | 16 | 81 | 1 | 0.9 | 1.3 | 300 |
| D | 0.5 | 2.7 | 27 | 67 | 1 | 1.8 | 2.3 | 180 |
| II | 1.0 | 4.3 | 34 | 54 | 1 | 5.2 | 6.4 | 150 |
| III | 1.5 | 7.1 | 42 | 43 | 2 | 7.0 | 8.0 | 150 |
| IV | 2.5 | 11.5 | 50 | 33 | 17 | 17.6 | 18.3 | 130 |

*after additional extraction with methyl ethyl ketone.

This clearly shows that a hydroperoxide content of at least four results in a high modulus at 100% elongation and a high tension at break at a sufficiently high elongation at break (>100%). The fraction that is soluble in hexane has then decreased considerably.

EXAMPLES V, VI, and VII

Larger portions of the graft copolymers of examples II, III and IV were extracted for 20 hours with boiling hexane, centrifuged and dried. Tensile testing of compression moulded plates manufactured from the graft copolymers thus obtained shows the following results (Table IV).

TABLE IV

| Example No. | —OOH/ chain | Styrene content % | Fraction soluble in hexane % | Modulus at 100% elongation MPa | Tension at break MPa | Elongation at break % |
| --- | --- | --- | --- | --- | --- | --- |
| II | 4.3 | 34 | 54 | 5.2 | 6.4 | 150 |
| V | 4.3 | 50 | 0 | 12.6 | 18.1 | 160 |
| III | 7.1 | 42 | 43 | 7.0 | 8.0 | 150 |
| VI | 7.1 | 53 | 0 | 16.3 | 18.6 | 140 |
| IV | 11.5 | 50 | 33 | 17.6 | 18.3 | 150 |
| VII | 11.5 | 57 | 0 | 17.7 | 20.5 | 170 |

These examples show that removal of the hexane-soluble fraction results in a considerable improvement of the modulus at 100% elongation and the tension at break and hardly affects the elongation at break.

EXAMPLES VIII and IX and COMPARATIVE EXPERIMENTS E and F

These examples show the importance of the number of hydroperoxide groups per rubber chain at (virtually) the same styrene content of the graft copolymers.

The photo-oxidations were carried out according to examples II, III and IV (variable illumination time).

The amounts of extra xylene and styrene used for the graftings were necessarily adjusted (see further example I).

The following table V shows the grafting conditions and results.

TABLE V

| Example No. Comp. Exp. No. | —OOH/ chain | Xylene l | Styrene kg | Styrene content % | Fraction soluble in hexane % | Modulus at 100% elongation MPa | Tension at break MPa | Elongation at break % |
| --- | --- | --- | --- | --- | --- | --- | --- | --- |
| E | 1.3 | 0.6 | 1.37 | 39 | 63 | — | 4.5 | 20 |
| VIII | 7.1 | 1.4 | 0.68 | 37 | 36 | 6.4 | 6.5 | 110 |
| F | 2.7 | 1.4 | 0.68 | 22 | 70 | 1.7 | 2.3 | 180 |
| IX | 15 | 1.8 | 0.30 | 20 | 48 | 2.1 | 7.5 | 300 |

EXAMPLE X and COMPARATIVE EXPERIMENT G

In this example KELTAN 778$^R$ [EPDM rubber of DSM] was used as photo-oxidizable rubber. In addition to 66% (m/m) ethylene, this rubber contained 4.5% (m/m) 2-ethylidene-norbornene. The Mooney viscosity was 63 (ML 1+4, 125° C.). The number average molar mass was 56 kg/mole.

1.73 of xylene, 0.115 kg of rubber and 0.6 g of Irganox 1076 were used for the photo-oxidation. The illumination time was 4 hours.

During the photo-oxidation the Hoekstra plasticity hardly changed (from 63 to 66). The number of hydroperoxide groups per rubber chain was 20, as determined with the analytical method of example I.

An extra 1.64 l of xylene and 0.299 kg of styrene were used for the grafting. For the rest see example I.

The following table VI gives the results.

TABLE VI

| Example No. Comp. Exp. No. | Illumination time hours | —OOH/ chain | Styrene content % | Fraction soluble in hexane % | Toluene gel % | Modulus at 100% elongation MPa | Tension at break MPa | Elongation at break % |
| --- | --- | --- | --- | --- | --- | --- | --- | --- |
| G | 0 | 0 | 0* | 100 | 0 | 1.1 | 8.5 | 1100 |
| X | 4 | 20 | 34 | 35 | 18 | 8.1 | 16.4 | 240 |

*after additional methyl ethyl ketone extraction.

EXAMPLES XI, XII and XIII and COMPARATIVE EXPERIMENTS H, I and J

In these examples the influence of the illumination time was investigated.

KELTAN 312 rubber was photo-oxidized in the same manner as in example II, with an adjusted illumination time, until a hydroperoxide content per rubber chain of 7.4 was obtained in examples XI, XII and XIII and a hydroperoxide content per rubber chain of 1.5 in the comparative experiments H, I and J.

The grating reactions were carried out as in example I, the only difference being the amounts of extra xylene and styrene used. In examples XI, XII and XIII 1.41 l of extra xylene and 0.673 kg of styrene were used. In comparative experiments H, I and J 0.93 l of extra xylene and 1.107 kg of styrene were used. Because of the lower hydroperoxide content in the comparative experiments, the styrene concentration had to be higher to obtain a somewhat comparable styrene content in the graft copolymer.

The following table VII gives the results.

TABLE VII

| Example No. Comp. Exp. No. | —OOH/ chain | Grafting time hours | Styrene content % | Fraction soluble in hexane % | Modulus at 100% elongation MPa | Tension at break MPa | Elongation at break % |
| --- | --- | --- | --- | --- | --- | --- | --- |
| XI | 7.4 | 1.0 | 18 | 77 | 2.7 | 4.1 | 180 |
| XII | 7.4 | 2.5 | 40 | 43 | 6.0 | 7.1 | 140 |
| XIII | 7.4 | 6.0 | 49 | 30 | 13.1 | 13.7 | 120 |
| H | 1.5 | 2.5 | 35 | 63 | 3.5 | 3.6 | 120 |
| I | 1.5 | 5.0 | 51 | 56 | — | 7.9 | 30 |
| J | 1.5 | 7.0 | 58 | 52 | — | 13.0 | 40 |

This shows that in the case of a rubber with fewer than four hydroperoxide groups per chain (H, I, J) the rubber character is lost (elongation < 100%) at longer grafting times. The hexane-soluble fraction then remains high. The results of examples XI, XII and XIII show that a person skilled in the art is able to control the properties as required also on the basis of the grafting time.

EXAMPLES XIV and XV

In these examples two monomers, styrene and acrylonitrile were grafted onto KELTAN 578$^R$ [EPDM rubber of DSM]. In addition to 65% (m/m) ethylene, the rubber contained 4.3% (m/m) 2-ethylidene-norbornene. The Mooney viscosity was 52 (ML 1+4, 125° C.). The number average molar mass was 50 kg/mole.

The photo-oxidation took place in the same manner as in example II, with the exception that 0.100 kg of KELTAN 578 dissolved in 1.50 l of toluene and 0.5 g of Irganox 1076 were used. The illumination time was four hours. The number of hydroperoxide groups per rubber chain was 18, as determined according to the method of example I.

A mixture of 0.164 kg of styrene and 0.087 kg of acrylonitrile was added for the grafting, which was effected at 100° C. for 2.5 and 4 hours, respectively. For the rest see example I.

The following table VIII shows the results.

TABLE VIII

| Example No. | Grafting time hours | S/AN % | Toluene gel % | Modulus at 100% elongation MPa | Tension at break MPa | Elongation at break % |
| --- | --- | --- | --- | --- | --- | --- |
| XIV | 2.5 | 21 | 2 | 7.2 | 11.2 | 190 |
| XV | 4.0 | 29 | 5 | 16.4 | 16.8 | 110 |

This shows the monomer mixtures can also successfully be cografted onto a photo-oxidized rubber, resulting in a graft copolymer with good properties.

We claim:

1. Graft copolymer obtainable by reacting:
    A) a rubbery base polymer that has been provided with hydroperoxide groups via photo-oxidation, with
    B) one or more radical-polymerizable graft monomers, characterized in that the graft copolymer is based upon
        a) 90-20 parts by weight of a rubbery base polymer containing at least 4 (four) hydroperoxide groups per rubber chain wherein said rubbery based polymer is selected from the group consisting of olefinically unsaturated polymers and ethylene-α-alkene-diene-polymers, and
        b) 80-10 parts by weight of one or more of the graft monomers.

2. Graft copolymer according to claim 1, characterized in that the rubber base polymer contains 5-35 hydroperoxide groups per rubber chain.

3. Graft copolymer according to claim 1, characterized in that the rubbery base polymer contains 6-20 hydroperoxide groups per rubber chain.

4. Graft copolymer according to claim 1, characterized in that the graft copolymer consists of the reaction-product of
    a) 75-50 parts by weight of A), with
    b) 50-25 parts by weight of B).

5. Graft copolymer according to claim 1, characterized in that B) is a monovinyl-aromatic monomer, whether or not substituted.

6. Graft copolymer according to claim 5, characterized in that B) is a combination of a) a monovinyl-aromatic monomer, whether or not substituted, and b') an unsaturated nitrile monomer or b'') an α- or β-unsaturated carboxylic acid or a derivative thereof.

7. Graft copolymer according to claim 6, characterized in that b') is acrylonitrile.

8. Graft copolymer according to claim 1, characterized in that B) is methyl methacrylate.

9. Graft copolymer according to claim 1, characterized in that the spirit-extractable fraction has been removed from the product of the grafting reaction.

10. Process for the preparation of a graft coolymer by reacting:
- A) a rubbery base polymer that has been provided with hydroperoxide groups via photo-oxidation, with
- B) one or more radical-polymerizable graft monomers, characterized in that
  - (a) 90–20 parts by weight of a rubbery based polymer containing at least 4 (four) hydroperoxide groups per rubber chain are reacted with
  - (b) 80–10 parts by weight of one or more of the graft monomers at a temperature of between 20° and 150° C., wherein said rubbery based polymer is selected from the group consisting of olefinically unsaturated polymers and ethylene-α-alkene-diene-polymers.

* * * * *